(No Model.)
W. J. GRINDEN.
FRAME CONNECTION FOR BICYCLES.
No. 547,990. Patented Oct. 15, 1895.
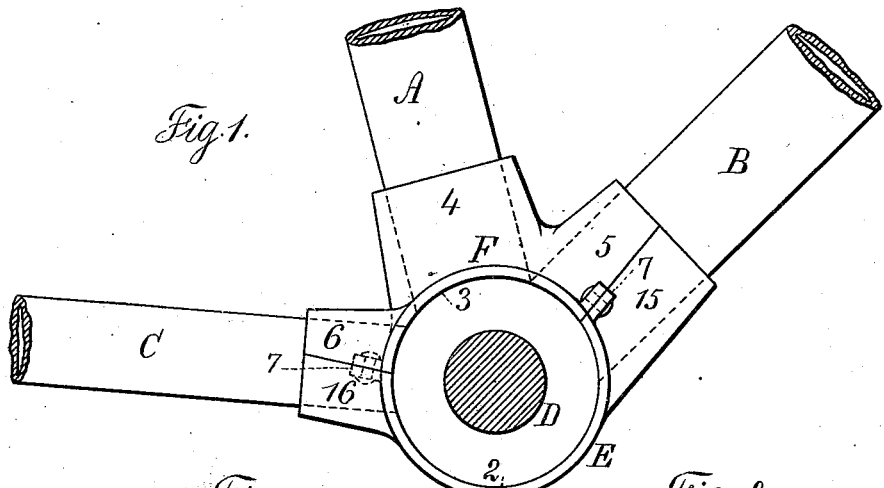
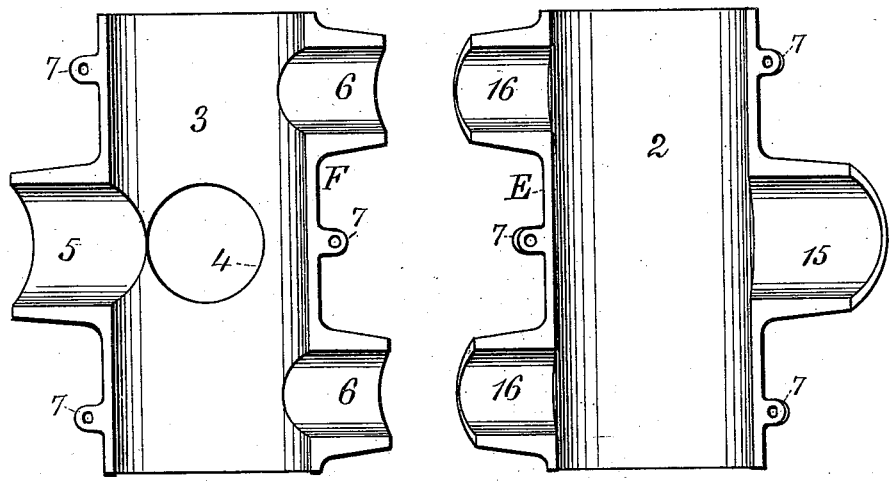
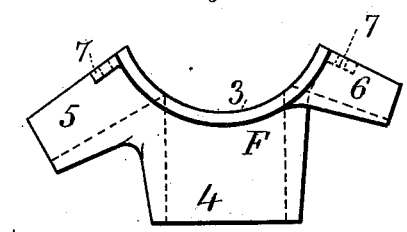
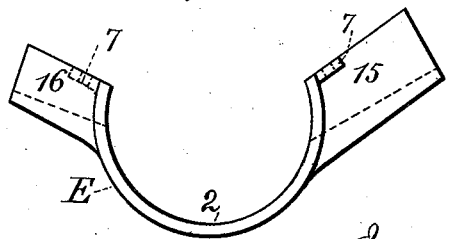

UNITED STATES PATENT OFFICE.

WILLIAM J. GRINDEN, OF BROOKLYN, NEW YORK, ASSIGNOR TO J. H. WILLIAMS & CO., OF SAME PLACE.

FRAME CONNECTION FOR BICYCLES.

SPECIFICATION forming part of Letters Patent No. 547,990, dated October 15, 1895.

Application filed January 14, 1895. Serial No. 534,737. (No model.)

*To all whom it may concern:*

Be it known that I, WILLIAM J. GRINDEN, a citizen of the United States, residing at Brooklyn, in the county of Kings and State of New York, have invented an Improvement in Frame Connections for Bicycles, of which the following is a specification.

The crank-shaft and ball-bearings in bicycles have been supported in the tubular portion of what is sometimes called the "bottom bracket" or the "crank-drum," that also serves as a connection between the tubes composing the frame where they come together at this place. Such connection has been made of wrought metal forged up to the proper exterior shape and drilled for the reception of the ends of the tubes of the frame and for the bearings of the crank-shaft, and the other couplings or connections of the frame have been similarly made as solid forgings of the proper exterior shape and drilled out for the reception of the tubes, and such tubes have been secured in place by brazing or solder. The construction of these frame connections in the manner aforesaid is expensive, and the metal is not as strong as it would be if forged of nearly the thickness of the finished article instead of having to be bored out; but to forge the connections of this character in a tubular form would involve more expense than to drill out such connections and would be substantially impracticable.

In order to obtain very strong and light connections for the bicycle-frame I forge such connections each in two parts or divided, so that the same can be struck up in dies and be brought to the exact or nearly exact shape required by the forging operations, so that the parts require but little finishing and can be set together around the tubes of the frame and brazed together and to such tubes. By this mode of construction the frame connections can be made much lighter and cheaper than heretofore, and the strength of such connections is greater than the strength of the intersecting tubes, because the lines of separation of the two parts of the frame connection do not depend for their strength upon the brazing of the edges of the connections together; but the strength of the tube itself is added because the brazing of the half-cylindrical sections of the connecting-pieces to the tubes themselves includes sufficient surface to make the brazing stronger than the tube itself—that is to say, the tube would break or bend in some other portion of its length before it would separate from the semi-cylindrical recesses in the joint connections into which the end of the tube is brazed, and the forging of the connections in the half-sections allows for the metal to be so thoroughly consolidated and hardened by the action of the dies that much thinner metal can be made use of and the same strength obtained than in the forgings heretofore employed.

In the drawings, Figure 1 is an end elevation of a frame connection adapted to the intersecting tubes at the bottom bracket or crank-drum. Figs. 2 and 3 are plan views of the two halves of such frame connection laid open separately, and Figs. 4 and 5 are end views of the parts shown in Figs. 2 and 3.

I do not limit myself to any particular shape of the frame connection for the bicycle, as the shape of such connections will vary according to the inclines at which the tubes are brought together or the angle at which one tube passes by the end of another tube.

The device represented in the drawings is adapted to the reception of a vertical or nearly vertical tube at A, an inclined tube at B, that extends to the handle-bar bearing, and to the side tubes C, that extend to the bearing for the rear wheel, and also to the reception of the ball-bearings of the crank-shaft, and I have illustrated the position of such crank-shaft at D, Fig. 1. The two portions or sections of the connection are shown at E and F. The portions 2 and 3 are nearly half-cylinders, and these are of a size adapted to receive within them the bushings for the ball-bearings of the crank-shaft, and the top section F has a socket 4, adapted to the tube A, extending up toward or for sustaining the saddle, and it has the half-socket recess 5, that comes over the end of the inclined tube B, and the half-socket recesses 6 6, that come over the ends of the side tubes C, and the bottom section E has the half-socket recess 15, that comes under the lower end of the inclined tube B, and the half-socket recesses 16, that come under the ends of the side tubes C. It is to be understood that the parts are forged out of any suitable metal—such, for instance, as wrought iron or steel—and the adjacent edges of the sections that come together may be milled off, filed, or otherwise rendered true, and, if desired, the shells can be clamped together and reamed out at the respective openings for the reception of the ends of the tubes, and, if desired, ears may be formed upon the respective shells, as shown at 7, that come together and may be riveted or screwed, so as to connect the sections firmly together previous to the introduction of the tubes that are to be connected, and the parts are brazed or soldered together in any suitable or well-known manner, and the bicycle-frame tubes are thus held in a reliable and rigid manner, and the connections made as aforesaid are very light and are proportioned so as to be stronger than the tubes that are united together, so that in cases of collision or injury to the frame of the bicycle the tubes will be bent or broken before the two-part frame connections made as aforesaid are separated.

I claim as my invention—

As a new article of manufacture, a bottom bracket or frame connection for bicycles made of wrought metal in two shells or sections each of which is provided with a half cylindrical recess and lateral half-cylindrical recesses adapted to receive the crossing tube and the tubes or bars passing laterally from the same, and one of such sections having a tubular socket for the reception of the end of a lateral tube or bar, the shells being also adapted to connection by brazing, substantially as specified.

Signed by me this 11th day of January, 1895.

WM. J. GRINDEN.

Witnesses:
　GEO. T. PINCKNEY,
　S. T. HAVILAND.